(12) United States Patent
Bhattacharya et al.

(10) Patent No.: US 10,986,183 B2
(45) Date of Patent: Apr. 20, 2021

(54) DATA MANAGEMENT IN A NETWORK ENVIRONMENT

(71) Applicant: HEWLETT PACKARD ENTERPRISE DEVELOPMENT LP, Houston, TX (US)

(72) Inventors: Suparna Bhattacharya, Bangalore (IN); Madhumita Bharde, Bangalore (IN); Santigopal Mondal, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 266 days.

(21) Appl. No.: 15/968,788

(22) Filed: May 2, 2018

(65) Prior Publication Data

US 2019/0342393 A1   Nov. 7, 2019

(51) Int. Cl.
*H04L 29/08* (2006.01)
*H04L 29/06* (2006.01)

(52) U.S. Cl.
CPC ............. *H04L 67/12* (2013.01); *H04L 69/22* (2013.01)

(58) Field of Classification Search
CPC ... H04L 67/12; G06F 21/604; G06F 21/6245; G06F 2209/506
See application file for complete search history.

(56) References Cited

U.S. PATENT DOCUMENTS

| | | | |
|---|---|---|---|
| 7,120,562 B1* | 10/2006 | Wilson | G06K 9/00523 702/189 |
| 8,411,977 B1* | 4/2013 | Baluja | G06K 9/527 382/240 |
| 8,938,595 B2* | 1/2015 | Sandorfi | G06F 11/1458 711/162 |
| 10,247,704 B2* | 4/2019 | Cegla | G01B 17/02 |
| 2006/0088219 A1* | 4/2006 | Zhang | G06K 9/00369 382/224 |
| 2007/0177596 A1* | 8/2007 | Bapat | H04L 41/0806 370/392 |
| 2008/0016131 A1* | 1/2008 | Sandorfi | G06F 11/1458 |
| 2009/0238041 A1* | 9/2009 | Levin | G01V 1/364 367/40 |

(Continued)

FOREIGN PATENT DOCUMENTS

WO   2017/204819 A1   11/2017

OTHER PUBLICATIONS

Papageorgiou et all., "Ral-Time Data Reduction at the Network Edge of Internet-of-Things Systems", Nov. 9, 2015, 11th international Conference on Network and Service Mnagement 2015, 8 pages total.*

(Continued)

*Primary Examiner* — Todd L Barker
(74) *Attorney, Agent, or Firm* — Jaffery Watson Mendonsa & Hamilton

(57) ABSTRACT

Example techniques of data management in a network environment are described. In an example, a semantic pattern in a data stream transmitted from a source device to an edge device in the network environment is determined. The semantic pattern indicates relevance of data samples in the data stream for analysis of the data stream. The data stream is processed based on the semantic pattern, for storage and transmission in the network environment.

16 Claims, 8 Drawing Sheets

(56) References Cited

U.S. PATENT DOCUMENTS

| | | | | |
|---|---|---|---|---|
| 2012/0203363 | A1* | 8/2012 | McKenna | H04H 20/93 700/94 |
| 2016/0033453 | A1* | 2/2016 | Cegla | G01N 29/343 73/602 |
| 2016/0294773 | A1* | 10/2016 | Yu | H04L 63/1425 |
| 2017/0060574 | A1 | 3/2017 | Malladi et al. | |
| 2017/0195238 | A1* | 7/2017 | Luo | H04L 47/2441 |
| 2018/0025019 | A1 | 1/2018 | Nadgowda | |
| 2018/0241852 | A1* | 8/2018 | Maluf | H04L 12/40013 |
| 2019/0026043 | A1* | 1/2019 | Chen | H04L 67/1097 |
| 2019/0034235 | A1* | 1/2019 | Yang | H04N 7/181 |
| 2019/0079740 | A1* | 3/2019 | Sharma | G06F 8/31 |
| 2019/0155684 | A1* | 5/2019 | Akutsu | G06F 11/1048 |
| 2019/0156442 | A1* | 5/2019 | Zuluaga | G06F 16/9535 |
| 2019/0278849 | A1* | 9/2019 | Chandramouli | G06F 16/24565 |
| 2019/0325328 | A1* | 10/2019 | Katz | G06F 17/14 |

OTHER PUBLICATIONS

Aazam et al., "Fog Computing:The Cloud-IoT/IoE middleware paradigm", May/Jun. 2016, IEEE Publishing.*

Signorini, "HPE and IoT Compute at the Edge", Enterprise Strategy Group, Mar. 2016, 5 pages.

Rehman, "Edge Computing in UAV's", Linked in, available online at <https://www.linkedin.com/pulse/edge-computing-uavs-ateeq-ur-rehman-rehman/>, Apr. 5, 2018, pp. 1-9.

MapR Technologies, Inc., "MapR Edge for the Internet of Things", available online at <mapr.com/whitepapers/mapr-edge-for-iot/>, 2018, pp. 1-9.

Kreps, "Questioning the Lambda Architecture", available online at <https://www.oreilly.com/ideas/questioning-the-lambda-architecture>, Jul. 2, 2014, 14 pages.

Kannan et al., "SEeSAW—Similarity Exploiting Storage for Accelerating Analytics Workflows", 8th USENIX Workshop on Hot Topics in Storage and File Systems (HotStorage 16), 2016, 5 pages.

Foghorn Systems, "Bringing the Power of Big Data to the Edge", available online at <foghorn.io/technology/>, 2018, pp. 1-5.

Doegarte, "GREEND: An energy dataset", Sourceforge, available online at <https://sourceforge.net/projects/greend/>, Apr. 3, 2017, 2 pages.

CityPulse, "CityPulse Dataset Collection", EU FP7 Project, available online at <https://web.archive.org/web/20180425093001/http://iot.ee.surrey.ac.uk:8080/>, Apr. 25, 2018, 3 pages.

Camgian Microsystems, "Camgian Breaks Ground with Latest Fog Computing Deployment", available online at <https://www.camgian.com/camgian-breaks-ground-with-latest-fog-computing-deployment/>, Oct. 18, 2016, pp. 1-6.

Bradicich et al., "The 7 Principles of the Internet of Things (IoT)", Industrial Internet Consortium, available online at <https://blog.iiconsortium.org/2015/07/the-7-principles-of-the-internet-of-things-iot.html>, Jul. 14, 2015, 3 pages.

Amazon Web Services, Inc., "What Is AWS Greengrass?", available online at <https://web.archive.org/web/20180131092527/https://docs.aws.amazon.com/greengrass/latest/developerguide/what-is-gg.html>, Jan. 31, 2018, 9 pages.

Muhammad Habib Ur Rehman et al., "RedEdge: A Novel Architecture for Big Data Processing in Mobile Edge Computing Environments," Journal of Sensor and Actuator Networks, Aug. 15, 2007, pp. 1-22, MDPI.

Shree Krishna Sharma and Xianbin Wang, "Live Data Analytics with Collaborative Edge and Cloud Processing in Wireless IoT Networks," IEEE Access, Mar. 20, 2017, pp. 1-15.

Yuan Ai et al., "Edge Cloud Computing Technologies for Internet of Things: A Primer," Digital Communications and Networks, Jul. 8, 2017, pp. 1-26.

* cited by examiner

DATA MANAGEMENT IN A NETWORK ENVIRONMENT

BACKGROUND

In a network environment, data may be transferred among different devices which can communicate over a network. The network may be a single type of network, such as a Local Area network (LAN), a Wide Area Network (WAN), a metropolitan Area Network (MAN), etc. or may be a collection of two or more types of networks interacting with each other. In an example, the network environment may be an Internet of Things (IoT) environment. The data may be processed at the different devices in the network and may be streamed from one device to another device over the network.

BRIEF DESCRIPTION OF DRAWINGS

The following detailed description references the drawings, wherein.

DETAILED DESCRIPTION

Figure 1:
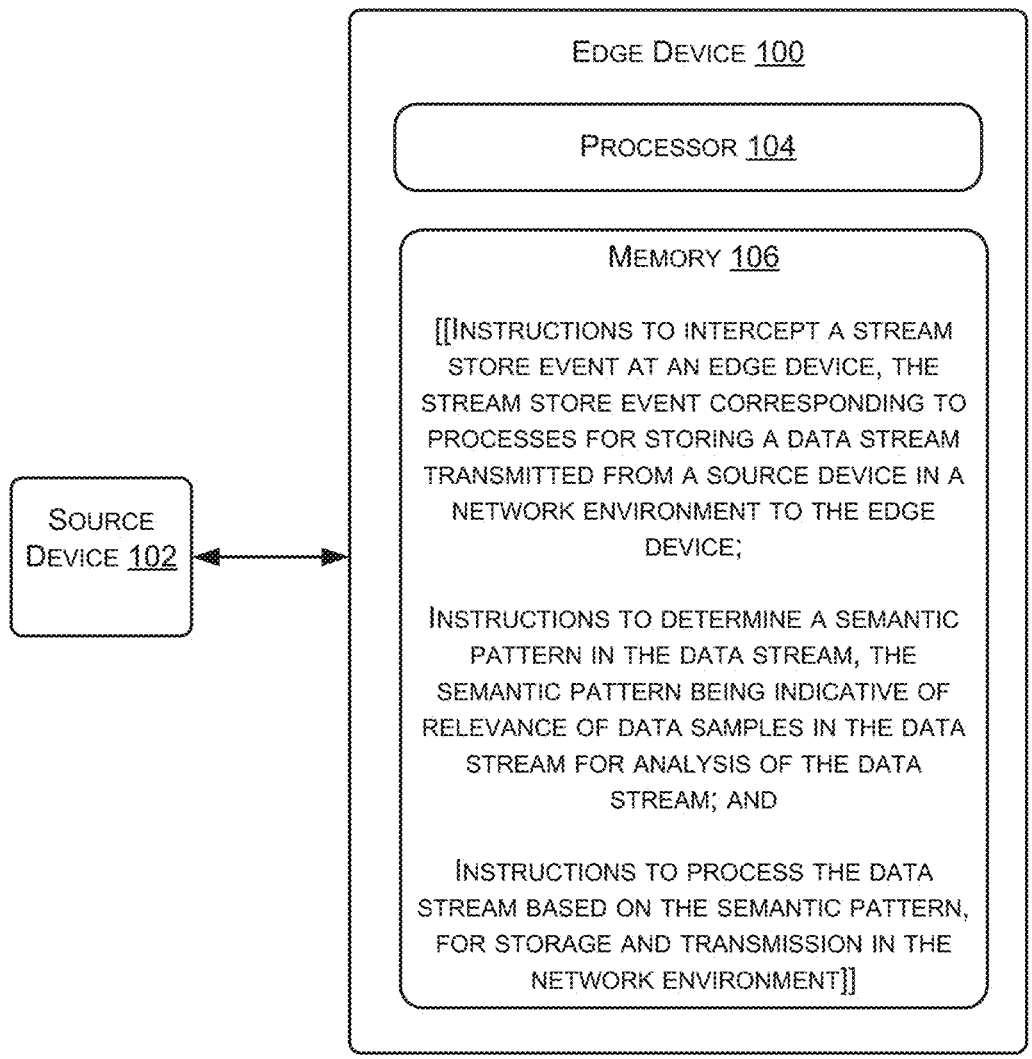
FIG. 1 illustrates an edge device coupled to a source device, according to an example.

The network environment includes source devices which are electronic devices having data collection and data exchange capabilities, such as sensors, transducers, computers, smartphones, etc. The source devices are provided with unique identifiers to exchange data over the network environment. The source devices may generate data relating to physical entities, such as real-world objects, devices, people, and animals, which may be analyzed to obtain meaningful insights for control and monitoring of the physical entities. In an example, the data relating to the physical entities generated by the source devices may be referred to as IoT data.

The network environment may include an edge device that receives the data collected by the source devices. The edge device is a computing system that acts as an entry point into a network, such as a private network, an enterprise network or a service provider core network. In an example, the edge device may connect an internal LAN with an external WAN or the Internet and provide interconnectivity and data traffic translation between the two networks. The edge device has compute, storage, networking, and virtualization capabilities. Examples of the edge device include edge servers, intelligent edge gateways, and converged IoT edge systems. The source devices may be connected to the edge device via Local Area Networks (LANs).

The network environment may include a core device. The edge device may communicate with the core device over a WAN, the internet, or a service provider network. In an example, in an IoT environment, the core device may be a remote datacenter where deep analytics of IoT data may be performed. At the core device, data mining operations are performed using analytics software applications to analyze, extract, and organize large amounts of IoT data to obtain insights that are acceptable, useful and beneficial for an organization, individual or analytics software application. Insights may include intermediate or resultant data that may be obtained upon performing the data mining operations on the IoT data. The insights may be transferred back to the edge device over the WAN which may be useful in controlling and predicting behavior and characteristics of the different physical entities from which the IoT data is collected.

A source device continuously generates data streams which are transferred to the edge device. The data streams may include similar data samples which are systematically repeated in the data streams over a period of time. The similar data samples refer to those data samples which, although not identical, may have similar values and which on being subjected to data mining operations at the core device may generate similar insights. Thus, the similar data samples may be considered as data duplicates for the purpose of the data mining operations at the core device. Examples of such similar data samples may be time series data streams which have the same or similar trend and cyclical components.

During processing of data at the edge device, data duplicates are generally detected and deduped by using storage deduplication techniques which compare raw data bytes to identify the data duplicates. However, with the similar data samples, although raw data bytes associated with the similar data samples may not be identical, the similar data samples may be considered as data duplicates since they may not generate unique or additional insights on being analyzed at the core device. Hence, storage deduplication techniques, generally employed at the edge device, are unable to detect and dedupe duplicate copies of the similar data samples. Thus, the duplicate copies of the similar data samples which are continuously conveyed from the source device to the edge device, gets redundantly stored at the edge device thereby consuming additional storage space at the edge device.

Further, the duplicate copies of the similar data samples are also transferred repetitively from the edge device to the core device over the WAN thereby resulting in higher bandwidth consumption of the WAN. Also, repetitive analysis of the duplicate copies of the similar data samples by the analytics software applications at the core device may consume additional processing resource of the core device and thereby reduce responsiveness of data analytics workflows at the core device. Further, in an example, IoT data received by the edge device from the source devices, such as time-series IoT data, may include dynamic fields of embedded metadata, such as timestamps, record ids, etc. The presence of the dynamic fields makes deduplication of the IoT data more complex.

The present subject matter describes techniques for processing the data stream at the edge device based on a semantic pattern of the data stream which enables storage of the data stream in a deduped and indexed manner and transmission of non-similar data to the core device. This facilitates saving of storage space, optimizes WAN bandwidth consumption, and reduces redundant processing of similar data at the edge and core devices. The present subject matter describes techniques for data management in the network environment. In an example, semantic pattern in a data stream transmitted from the source device to the edge device is determined. The semantic pattern indicates relevance of data samples in the data stream for analysis of the data stream. Analysis of the data stream includes data mining operations performed on the data stream using analytical software applications to obtain insights. Insights may include intermediate or resultant data that may be obtained upon performing the data mining operations on the data stream. Examples of analytical operations that may be performed on the data stream include descriptive analysis, diagnostic analysis, predictive analysis, prescriptive analysis, short term/long term learning, trends analysis, or the like. The data stream is processed for storage and transmission in the network environment based on the determined semantic pattern.

By determining the semantic pattern, the data stream or a collection of data samples of the data stream may be categorized as semantically duplicate or semantically unique. Semantically duplicate data is irrelevant for analysis of the data stream and semantically unique data is relevant for analysis of the data stream. In the present subject matter, the semantically unique data is selectively stored at the edge device and transmitted from the edge device to the core device. The semantically duplicate data is either discarded or transmitted to the core device in a compressed form as data pointers linked to previously stored similar data.

Thus, duplicate copies of the similar data samples are not stored redundantly at the edge device thereby saving storage space at the edge device. Further, the present subject matter also reduces repetitive processing of the duplicate copies of the similar data samples at the edge device and the core device which enhances processing speed and responsiveness of the edge and the core devices. Also, since the semantically duplicate data is not repeatedly conveyed from the edge device to the core device over the WAN, bandwidth consumption of the WAN is reduced. Further, in an example, raw data of the data stream is first segregated from its associated metadata and then the semantic pattern in the raw data is determined. By segregating the raw data from the metadata and then processing the raw data based on its semantic pattern, the data stream may be stored in the edge device in an efficiently deduped and indexed manner.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates an edge device 100 coupled to a source device 102, according to an example of the present subject matter. In an example, the edge device 100 may be an edge server, an intelligent edge gateway, or a hyper converged IoT edge system disposed in a network environment. The edge device 100 may be capable of hosting streaming platforms, hyper converged systems, and other processes or applications for storage and streaming of data. Examples of the source device 102 includes IoT sensors, such as a traffic sensor, a camera streaming video, a heart-beat monitor, a windspeed sensor, or the like. The source device 102 may communicate with the edge device 100 over a local area network (LAN).

The edge device 100 includes a processor 104 and a memory 106 coupled to the processor 104. The memory 106 stores instructions executable by the processor 104. The instructions when executed by the processor 104 cause the processor to intercept a stream store event at the edge device 100. The stream store event corresponds to processes for storing a data stream transmitted from the source device 102 to the edge device 100 in the memory 106 of the edge device 100. In some examples, the stream store event may correspond to processes for storing a data stream received by the edge device 100 from application(s) capable of generating a data stream or processing an incoming data stream at the edge device 100. Intercepting the stream store event refers to pausing storage of the data stream in the memory 106 after receiving a request from the source device 102 for storing the data stream in the memory 106.

Further, the instructions when executed by the processor 104 cause the processor 104 to determine a semantic pattern in the data stream. The semantic pattern is indicative of relevance of data samples in the data stream for analysis of the data stream. A data stream refers to a continuous flow of data bits for a particular time interval called a streaming interval. A data sample is a numerical value of data in the data stream at a particular time instance of the streaming interval. Analysis of the data stream includes data mining operations performed on the data stream using analytics software applications to analyze, extract, and organize large amounts of data to obtain insights that are acceptable, useful and beneficial for an organization, individual or analytics software applications. Insights may include intermediate or resultant data that may be obtained upon performing the analysis on the data samples. Examples of the analysis includes traffic hotspot identification based on statistical traffic data, weather forecasting using weather forecasting applications, etc.

A data sample of the data stream may be considered relevant for the analysis if the data sample upon analysis generates new or additional insights. By determining the semantic pattern, the data stream or a collection of data samples of the data stream may be categorized as semantically duplicate or semantically unique. Semantically duplicate data samples are irrelevant for the analysis, whereas, semantically unique data samples are relevant for the analysis of the data stream.

Further, the instructions when executed by the processor 104 cause the processor 104 to process the data stream for storage and transmission in the network environment based on the determined semantic pattern. In an example, semantically duplicate data may be discarded or transmission of semantically duplicate data streams may be deprioritized, whereas, semantically unique data may be selectively stored and transmitted. Thus, consumption of storage space at the edge device 100 may be reduced, bandwidth consumption of WAN connecting the edge device 100 to a core device (not shown) may be reduced, and redundant processing of duplicate data at the edge device 100 and the core device may be eliminated. Aspects described with respect to FIG. 1 are further described in detail with respect to FIG. 2.

Figure 2:
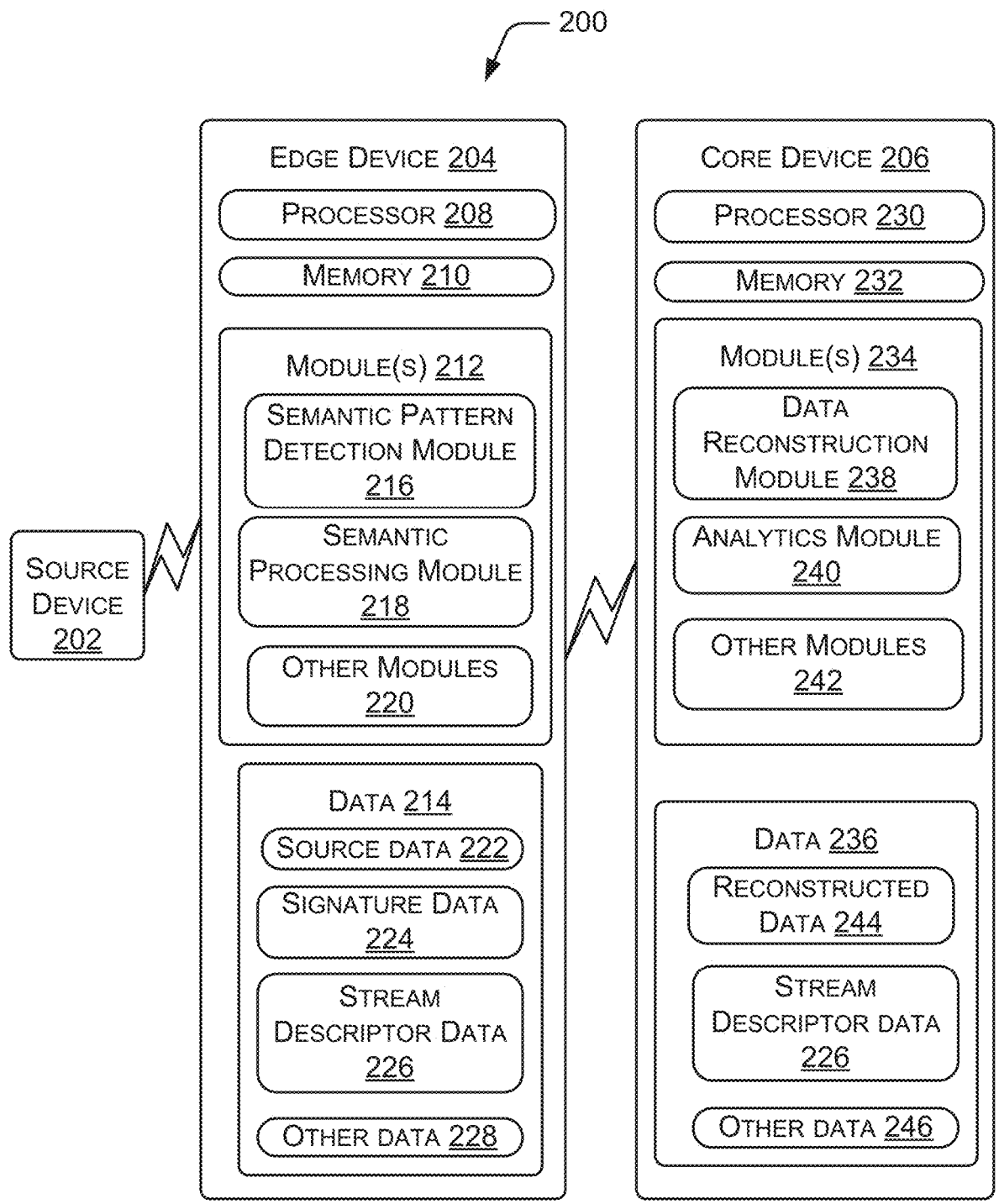
FIG. 2 illustrates a network environment, according to an example.

FIG. 2 illustrates a network environment 200, according to an example of the present subject matter. A source device 202, an edge device 204, and a core device 206 are disposed in the network environment 200. The source device 202 is similar to the source device 102 and the edge device 204 is similar to the edge device 100 and includes the capabilities of the edge device 100. The core device 206 may be a remote datacenter where deep analytics of data may be performed. At the core device 206, analysis of data may be performed using analytics software applications to obtain insights. The source device 202 may communicate with the edge device 204 via a Local Area Network (LAN). The edge device 204 may communicate with the core device 206 over a Wide Area Network (WAN) or the Internet.

The edge device 204 includes a processor 208 coupled to a memory 210. The core device includes a processor 230 coupled to a memory 232. The processor 208 and 230 may be implemented as microprocessors, microcomputers, microcontrollers, digital signal processors, central processing units, state machines, logic circuitries, and/or any devices that manipulate signals based on operational instructions. Among other capabilities, the processor 208 is configured to fetch and execute computer-readable instructions stored in the memory 210. The processor 230 is configured to fetch and execute computer-readable instructions stored in the memory 232.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The memory 210 and 232 may include any computer-readable medium known in the art including, for example, volatile memory (e.g., RAM), and/or non-volatile memory (e.g., EPROM, flash memory, etc.). Modules 212 and data 214 may reside in the memory 210. Modules 234 and data 236 may reside in the memory 232. The modules 212 and 234 can be implemented as instructions stored on a computer readable medium and executable by a processor and/or as hardware. The modules 212 and 234 include routines, programs, objects, components, data structures, and the like, which perform particular tasks or implement particular abstract data types.

The modules 212 include a semantic pattern detection module 216 which corresponds to instructions stored on a computer readable medium and executable by a processor to determine semantic pattern in a data stream and a semantic processing module 218 which corresponds to instructions stored on a computer readable medium and executable by a processor to processes storage and transmission of the data stream based on the semantic pattern. The modules 212 also comprise other modules 220 that supplement applications on the edge device 204, for example, modules of an operating system.

The modules 234 include a data reconstruction module 238 which corresponds to instructions stored on a computer readable medium and executable by a processor to reconstruct a data stream from its corresponding signature and an analytics module 240 which corresponds to instructions stored on a computer readable medium and executable by a processor to execute analytics software applications for analysis of the data. The modules 234 also include other modules 242 that supplement applications on the core device 206, for example, modules of an operating system.

The data 214 serves, amongst other things, as a repository for storing data that may be fetched, processed, received, or generated by the modules 212. The data 214 includes source data 222 received from the source device 202, signature data 224 for storing data stream related signatures which include representative coefficients of the source data, and stream descriptor data 226 for storing metadata related to the data stream. The data 214 comprises other data 228 corresponding to the other modules 220.

The data 236 serves, amongst other things, as a repository for storing data that may be fetched, processed, received, or generated by the modules 234. The data 236 includes reconstructed data 244 reconstructed from a transformed form of the data stream and stream descriptor data 226 which may be communicated from the edge device 204 to the core device 206. The data 236 comprises other data 246 corresponding to the other modules 242.

In operation, the source device 202 may send a data stream to the edge device 204 over the LAN. In an example, the data stream may be a stream of IoT data collected from the network environment 200. In an example, the semantic pattern detection module 216 may intercept a stream store event at the memory 210 of the edge device 204. The stream store event corresponds to processes for storing the data stream in the memory 210 of the edge device 204. Once the stream store event is intercepted, data write operations at the memory 210 are temporarily paused.

The description hereinafter elaborates determining the semantic pattern in the data stream and processing the data stream based on the semantic pattern according to example implementations.

In an example implementation, the semantic pattern detection module 216 may split the data stream into a plurality of streamlets. A streamlet may be understood as a collection of data samples of the data stream. In an example, a streamlet signature for the streamlet may be determined by the semantic pattern detection module 216. The streamlet signature is indicative of the semantic pattern of the streamlet. In an example, the streamlet signature is a compressed representation of data samples or trends of data samples present in the streamlet. The semantic pattern detection module 216 may apply a data transformation technique on the streamlet to obtain the streamlet signature. The streamlet signature may be a set of representative coefficients obtained upon application of the data transformation technique on the streamlet. The data transformation technique applied may depend on the type of data, such as time-series data, geo-spatial data, and asset data. For example, for time-series data the data transformation technique applied may be a Discrete Wavelet Transform (DWT), such as Haar Transform.

In an example, upon determining the streamlet signature, the streamlet signature may be directly transmitted to the core device 206 for analytics operations. Since, the streamlet signature is a compressed form and therefore has a reduced size as compared to the actual streamlet, the bandwidth usage for transmitting the streamlet signature over the WAN to the core device 206 is less. On receiving the streamlet signature, the data reconstruction module 238 at the core device 206 may reconstruct the actual streamlet from the streamlet signature. In an example, where a DWT is applied on the streamlet at the edge device 204 to obtain the streamlet signature, an inverse DWT may be performed on the streamlet signature at the core device 206 to reconstruct the actual streamlet. Thus, a copy of the actual streamlet may be obtained at the core device 206 without transmitting the actual streamlet over the WAN.

In an example, the semantic pattern detection module 216 compares the streamlet signature with a previous streamlet signature. The previous streamlet signature corresponds to a signature of a previous streamlet of a data stream previously transmitted from the source device 202 to the edge device 204. The previous streamlet signature may be a set of representative coefficients obtained on application of a data transformation technique on the previous streamlet. The data transformation technique may be a DWT transform. In an example, the previous streamlet signature may be stored in a database of streamlet signatures maintained in the memory 210 of the edge device 204. If the edge device 204 is receiving data for the first time, the streamlet signature may be compared with a set of predefined streamlet signatures which may be stored in the database of streamlet signatures at the edge device 204. Based on the comparison, the semantic pattern detection module 216 determines whether the streamlet signature matches with the previous streamlet signature. In an example, it may be determined that the streamlet signature matches with the previous streamlet signature, if the streamlet signature and the previous streamlet signature lie within a predefined distance metric. For example, it may be determined that the streamlet signature matches with the previous streamlet signature, when values of a set of representative coefficients of the streamlet signature and values of another set of representative coefficients of the previous streamlet signature lie within a threshold specified by the predefined distance metric.

In response to the streamlet signature matching with the previous streamlet signature, the semantic pattern detection module 216 identifies the streamlet to be semantically duplicate to the previous streamlet. The streamlet identified as a semantically duplicate streamlet is irrelevant for analysis of the data stream at the core device 206. That is, the semantically duplicate streamlet upon analysis at the core device 206 does not generate additional or new insights.

In response to the streamlet signature mismatching with the previous streamlet signature, the semantic pattern detection module 216 identifies the streamlet to be semantically unique. The semantically unique streamlet is relevant for analysis of the data stream at the core device 206. That is, the semantically unique streamlet upon analysis at the core device 206 generates additional or new insights. Thus, on determining the semantic pattern according the above explained technique, streamlets of the data stream may be categorized as semantically duplicate or semantically unique and may be processed based on the semantic pattern, as explained below.

In an example, in response to the streamlet being identified to be semantically duplicate to the previous streamlet, the semantically duplicate streamlet may be discarded and the semantic processing module 218 may associate the streamlet signature to the previous streamlet. The association between the streamlet signature and the previous streamlet may be represented in the form of a linkage information, such as a data pointer. The semantic processing module 218 may transmit one of the streamlet signature and the linkage information to the core device 206. Since, the streamlet signature and the linkage information, which are compressed representations of data, are transmitted to the core device 206 instead of the semantically duplicate data itself, the amount of data transfer over the WAN is reduced thereby reducing bandwidth usage. In an example, in response to the streamlet being identified to be semantically unique, the semantic processing module 216 may transmit the actual streamlet to the core device 206.

According to another example implementation, prior to determining the streamlet signature of the streamlet, the semantic pattern detection module 216 may segment the data stream received from the source device 202 to separate metadata of the data stream from raw data of the data stream. The raw data refers to unprocessed data points collected from the source device 202. The metadata provides information about the raw data. The metadata includes timestamps, record ids, data types, window size, and other contextual information relating to the raw data. The semantic pattern detection module 216 stores the metadata in a predefined header structure corresponding to the data stream. The predefined header structure includes the contextual information about the raw data and may be communicated to the core device 206, where it can be used for reconstruction of the data stream. After separating the raw data from the metadata, the semantic pattern detection module 218 may then split the raw data of the data stream into the plurality of streamlets. The plurality of streamlets may be then processed according to the example implementation described above for determination of the semantic pattern.

Upon determination of the semantic pattern, in response to the streamlet being identified to be semantically unique, the semantic processing module 218 creates a sematic hash identifier associated with the streamlet. The semantic hash identifier may be a semantic hash value of the streamlet identified to be semantically unique. The semantic hash value may be obtained by applying a semantic hash operation on the streamlet identified as semantically unique. The semantic hash identifier points to a memory block in the memory 210 where the semantically unique streamlet is stored. Semantic hash values linked with respective streamlets may be indexed and organized in a hash table in the memory 210, which facilitates data lookup and deduplication. In an example, content-addressable stores may be used to store the semantic hash identifier and its associated streamlet(s).

In response to the streamlet being identified to be semantically duplicate to a previous streamlet, the semantic processing module 218 may replace the streamlet by a semantic hash identifier linked to the previous streamlet. The previous streamlet refers to a streamlet of a data stream which was transmitted from the source device 202 to the edge device 204 prior to the current data transfer. The semantic hash identifier linked to the previous streamlet may represent a hash value of the previous streamlet. The hash value may be obtained on application of a semantic hash operation on the previous streamlet. The semantic hash identifier linked to previous streamlet points to a memory block in the memory 210 where the previous streamlet is stored. On replacing the streamlet identified as semantically duplicate with the semantic hash identifier linked to the previous streamlet, the semantically duplicate streamlet itself may be discarded. The semantic processing module 218 stores the semantic hash identifier linked to the previous streamlet in the memory 210 of the edge device 204. Thus, the semantic hash identifier which is a representative of the semantically duplicate streamlet, is stored in the memory 210 instead of the actual streamlet. This saves storage space and provides semantically deduped data storage at the edge device 204.

Further, in an example, a streamlet on being identified as semantically duplicate to a previous streamlet, raw data of the streamlet and the previous streamlet may be compared. In an example, in response to the streamlet being identified to be semantically duplicate to the previous streamlet, the semantic processing module 218 compares a first hash identifier corresponding to raw data of the streamlet with a second hash identifier corresponding to raw data of the previous streamlet. The first hash identifier is obtained on applying a hash function on the raw data of the streamlet and the second hash identifier is obtained on applying the hash function on the raw data of the previous stream let. The first and second hash identifier may be hash digests stored in a hash table maintained in the memory 210 of the edge device 204.

In response to the first hash identifier matching with the second hash identifier, the semantic processing module 218 identifies the streamlet to be a duplicate streamlet of the previous streamlet. The duplicate streamlet and the previous streamlet has identical raw data values, i.e., the duplicate streamlet and previous streamlet are absolutely identical. On identifying the streamlet to be the duplicate streamlet of the previous streamlet, the semantic processing module 218 may discard the duplicate streamlet. In an example, the semantic processing module 218 replaces the duplicate streamlet with a reference link, such as a hash digest, pointing to the previous streamlet and stores the reference link in the memory 210 of the edge device 204.

In response to the first hash identifier mismatching with the second hash identifier, the streamlet is identified to include unique raw data. Unique raw data refers to unprocessed data points not previously received by the edge device 204 from the source device 202. Thus, although the streamlet had been identified as a semantic duplicate to the previous streamlet, the raw data values of the streamlet and the previous streamlet are not identical. The semantic processing module 218 stores the unique raw data associated with the second hash identifier in the memory 210 of the edge device 204.

Further, the semantic processing module 218 may provide an exact view and a semantic view of the data stream. The exact and semantic views may be understood as modes of accessing data stored in the memory 210. In the exact view, the semantic hash identifier linked to the previous streamlet and the unique raw data associated with the second hash identifier is accessible. In the semantic view, the semantic hash identifier linked to the previous streamlet is accessible. In an example, application(s) which fetch data from the edge device 204 may operate according to the exact view and thereby access semantically deduped data along with the associated raw data values from the memory 210. In another example, the application(s) may operate according to the semantic view to fetch the semantically deduped data without accessing the raw data. Thus, depending on the view or mode of data access, application(s) may fetch semantically deduped data or semantically deduped data along with associated raw data from the memory 210 of the edge device 204.

Another example implementation of determining the semantic pattern in the data stream and processing the data stream based on the semantic pattern is described hereinafter.

In an example, the semantic pattern detection module 216 intercepts a stream store event at the edge device 204 at a current time instance rte. After intercepting the stream store event, the semantic pattern detection module 216 determines a first stream signature for the data stream transmitted from the source device 202 to the edge device 204 over a first time interval. The first stream signature is indicative of the semantic pattern of the data stream transmitted over the first time interval. The first stream signature may be obtained by applying a data transform operation, such as Discrete Wavelet Transform (DWT) on the data stream transmitted during the first time interval. Consider the first time interval as a time interval between a first time instance and a second time instance 't2', where the second time instance 't2' lies between the first time instance and the current time instance 'tc'.

The semantic pattern detection module 216 determines a second stream signature for the data stream transmitted from the source device 202 to the edge device 204 over a second time interval. The second stream signature is indicative of the semantic pattern of the data stream transmitted over the second time interval. The second stream signature may be obtained by applying a data transform operation, such as Discrete Wavelet Transform (DWT) on the data stream transmitted during the second time interval. The second time interval includes the first time interval. The second time interval is a time interval between the first time instance 't1' and the current time instance 'tc'.

The semantic pattern detection module 216 compares the first stream signature with the second stream signature. In response to the first stream signature matching the second stream signature, the semantic pattern detection module 216 identifies that a portion of the data stream transmitted between the first time interval and the second time interval is semantically duplicate to the data stream transmitted over the first time interval. The portion of the data stream refers to a collection of data points in the data stream.

When the portion of the data stream is identified to be semantically duplicate to the data stream transmitted over the first time interval, the semantic processing module 218 deprioritizes streaming of the portion of the data stream transmitted between the first time interval and the second time interval to the core device 206. Deprioritizing includes pausing the streaming of the portion of the data stream to the core device 206 and allowing other high priority data streams to be streamed first. In an example, the semantic processing module 218 may discard or cancel transmission of the portion of the data stream identified to be semantically duplicate to the core device 206. The portion of the data stream identified to semantically duplicate may not provide new or additional insights, hence analytical software applications or models running at the core device 206 may not be retrained based on the portion of the data stream identified to be semantically duplicate. Therefore, such semantically duplicate data may not be transmitted to the core device 206.

In response to the first stream signature mismatching with the second stream signature, the semantic processing module 218 identifies that the portion of the data stream transmitted between the first time interval and the second time interval is semantically unique. On identifying the portion of the data stream to be semantically unique, the semantic processing module 218 streams the portion of the data stream from the edge device 204 to the core device 206. Since, the portion of the data stream identified to semantically unique provides new or additional insights, hence analytical software applications or models running at the core device 206 may be retrained based on the portion of the data stream identified to be semantically unique. Therefore, such semantically unique data is transmitted to the core device 206.

In some examples, determining the semantic pattern of the data stream according to the above described example implementations may also be implemented in a distributed analytics workflow, where part of the workflow is executed at the edge device 204 and another part of the workflow is executed at the core device 206. In an example, geo-distributed adaptive learning techniques may be used to ensure that determination of the semantic pattern is performed at the edge device 204 and semantically unique portion of the data stream is communicated to the core device 206. The semantic pattern in the data stream may be determined according to the examples as described earlier. Since, the semantic pattern is determined at the edge device 204 and semantically unique portions of the data stream are communicated to the core device 206, therefore data transfer over the WAN from the edge device 204 to the core device 206 is reduced.

In an example, workflow knowledge of the distributed analytics workflow is shared between the edge device 204 and the core device 206. The core device 206 may communicate the workflow knowledge indicative of distribution of the steps of the analytics workflow to the edge device 204. Based on the workflow knowledge, the core device 206 may drive a feedback learning path by tuning and communicating the workflow distribution to the edge device 204. The edge device 204 may execute functions based on the workflow knowledge, may determine semantic pattern in the data stream, and communicate semantically unique data by detecting the semantic pattern as per current workflow distribution. Once the semantic pattern is determined and semantically unique data is communicated to the core device 206, further steps of the analytics workflow may be executed at the core device 206.

Figure 3:
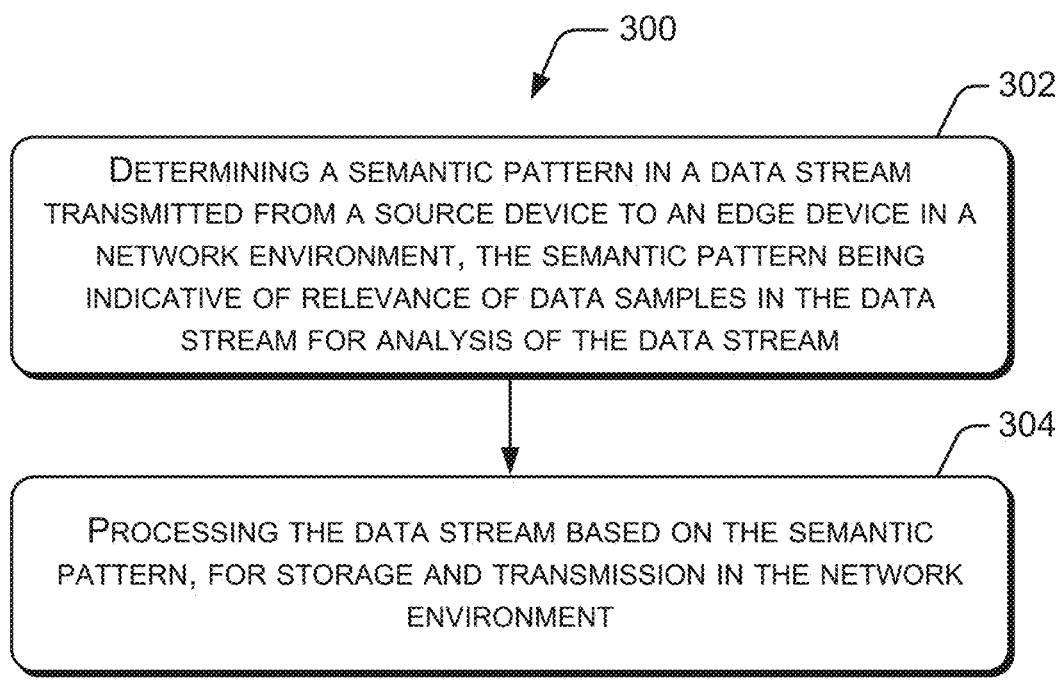
FIG. 3 illustrates a method for data management in a network environment, according to an example.

FIG. 3 illustrates a method 300 for data management in a network environment, according to an example. The method 300 can be implemented by processing resource(s) or computing device(s) through any suitable hardware, a non-transitory machine readable medium, or combination thereof. In an example, the method 300 may be performed by a semantic pattern detection module, such as the semantic pattern detection module 216 which includes instructions stored on a medium and executable by a processing resource, such as the processor 104 or 208, of an edge device, such as the edge device 100 or 204. Further, although the method 300 is described in context of the aforementioned edge device 100 or 204, other suitable systems may be used for execution of the method 300. It may be understood that processes involved in the method 300 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media.

Referring to FIG. 3, at block 302, a semantic pattern in a data stream transmitted from a source device to an edge device in a network environment, such as the network environment 200, is determined by a processing resource of the edge device. The semantic pattern is indicative of relevance of data samples in the data stream for analysis of the data stream. Upon determining the semantic pattern, data may be categorized as semantically duplicate or semantically unique.

At block 304 the data stream is processed based on the semantic pattern for storage and transmission in the network environment. In an example, streamlets in the data stream identified as semantically duplicate may be discarded and the streamlets identified as semantically may be selectively stored and/or transmitted to a core device, such as the core device 206 in the network environment.

Figure 4:
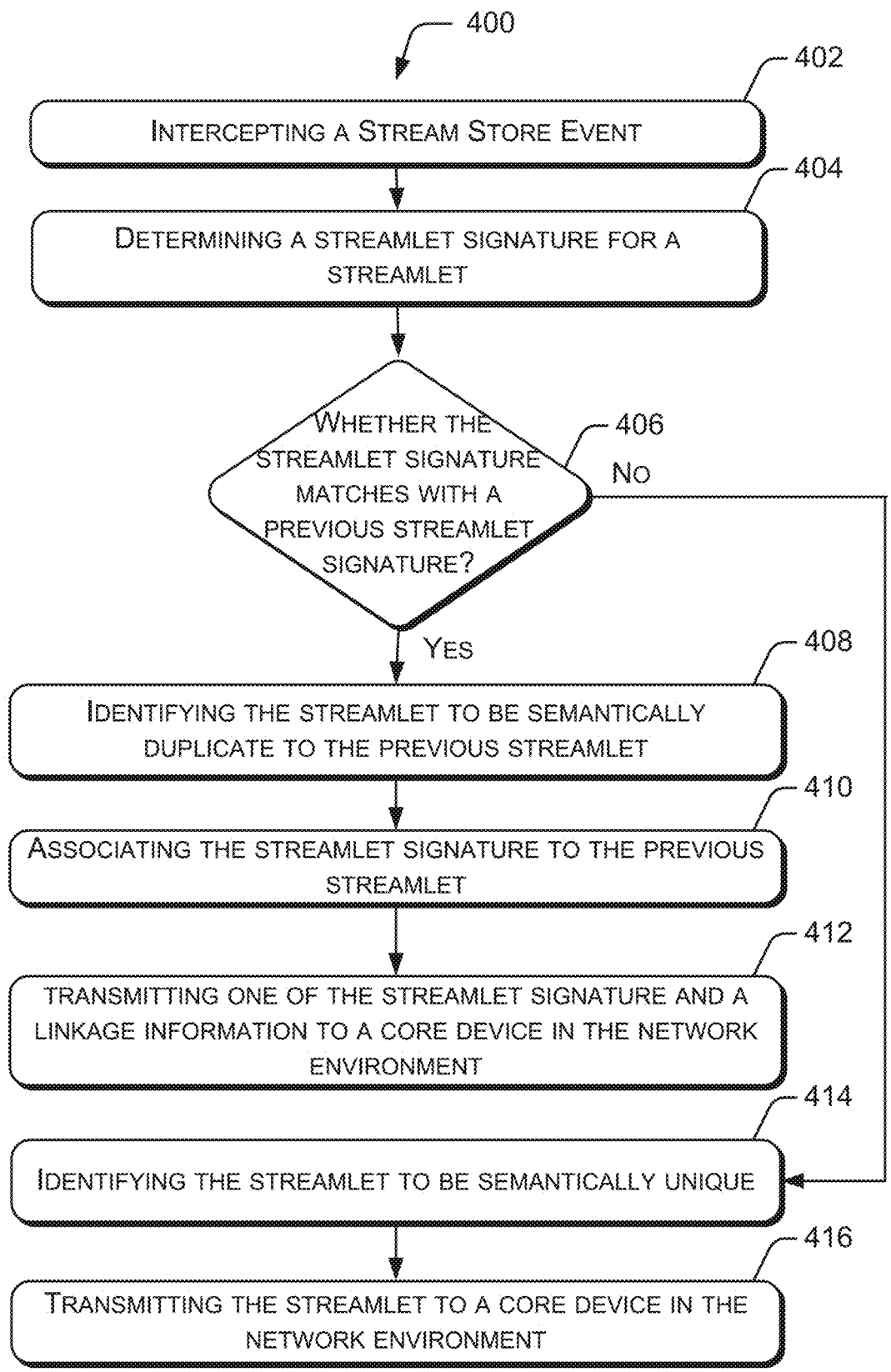
FIG. 4 illustrates a method for data management in the network environment, according to an example.

FIG. 4 illustrates a method 400 for data management in a network environment, according to an example. In an example, steps of the method 400 may be performed by a semantic pattern detection module, such as the semantic pattern detection module 216 and a semantic processing module, such as the sematic processing module 218.

At block 402, stream store event is intercepted. The stream store event corresponds to processes for storing a data stream transmitted from a source device, such as the source device 102 or 202, in the network environment to an edge device, such as the edge device 100 or 204, in the memory of the edge device. Intercepting the stream store event refers to pausing storage of the data stream in the memory after receiving a request from the source device for storing the data stream in the memory.

In an example, the data stream may be split into a plurality of streamlets. A streamlet may be understood as a collection of data samples of the data stream. In an example, a streamlet signature for the streamlet may be determined. The streamlet signature is indicative of the semantic pattern of the streamlet. In an example, the streamlet signature is a compressed representation of data samples or trends of data samples present in the streamlet. A data transformation technique, such as a Discrete Wavelet Transform (DWT) may be applied on the streamlet to obtain the streamlet signature.

The streamlet signature may be compared with a previous streamlet signature. The previous streamlet signature corresponds to a signature of a previous streamlet of a data stream previously transmitted from the source device to the edge device. In an example, the previous streamlet signature may be stored in a database of streamlet signatures maintained in the memory of the edge device. Based on the comparison, it may be determined whether the stream let signature matches with the previous streamlet signature, at block 406.

At block 408, in response to the streamlet signature matching with the previous streamlet signature, the streamlet is identified to be semantically duplicate to the previous streamlet. The streamlet identified as a semantically duplicate streamlet is irrelevant for analysis of the data stream at the core device.

At block 410, in response to the streamlet being identified to be semantically duplicate to the previous streamlet, the semantically duplicate stream let may be discarded and the streamlet signature may be associated to the previous streamlet. The association between the streamlet signature and the previous streamlet may be represented in the form of a linkage information, such as a data pointer. At block 412, one of the streamlet signature and the linkage information may be transmitted to the core device in the network environment. Since, the streamlet signature or the linkage information, which are compressed representations of data, is transmitted to the core device instead of the semantically duplicate data itself, the amount of data transfer over the WAN is reduced thereby reducing bandwidth usage.

In response to the streamlet signature mismatching with the previous stream let signature the streamlet is identified to be semantically unique, at block 414. The semantically unique streamlet is relevant for analysis of the data stream at the core device. At block 416, in response to the streamlet being identified to be semantically unique, the actual streamlet may be transmitted to the core device.

Figure 5:
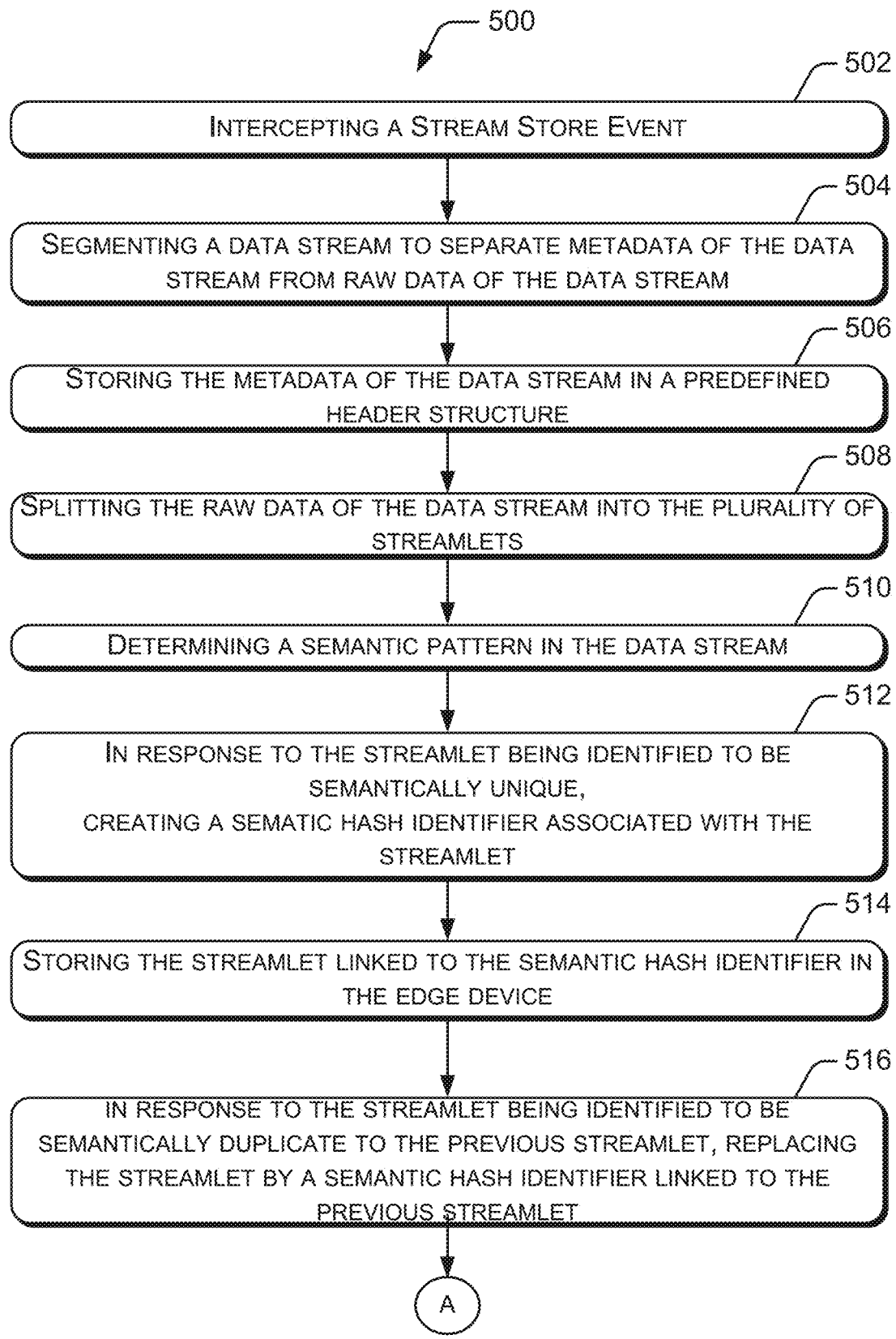
FIG. 5 illustrates a method for data management in the network environment, according to an example.
Figure 5:
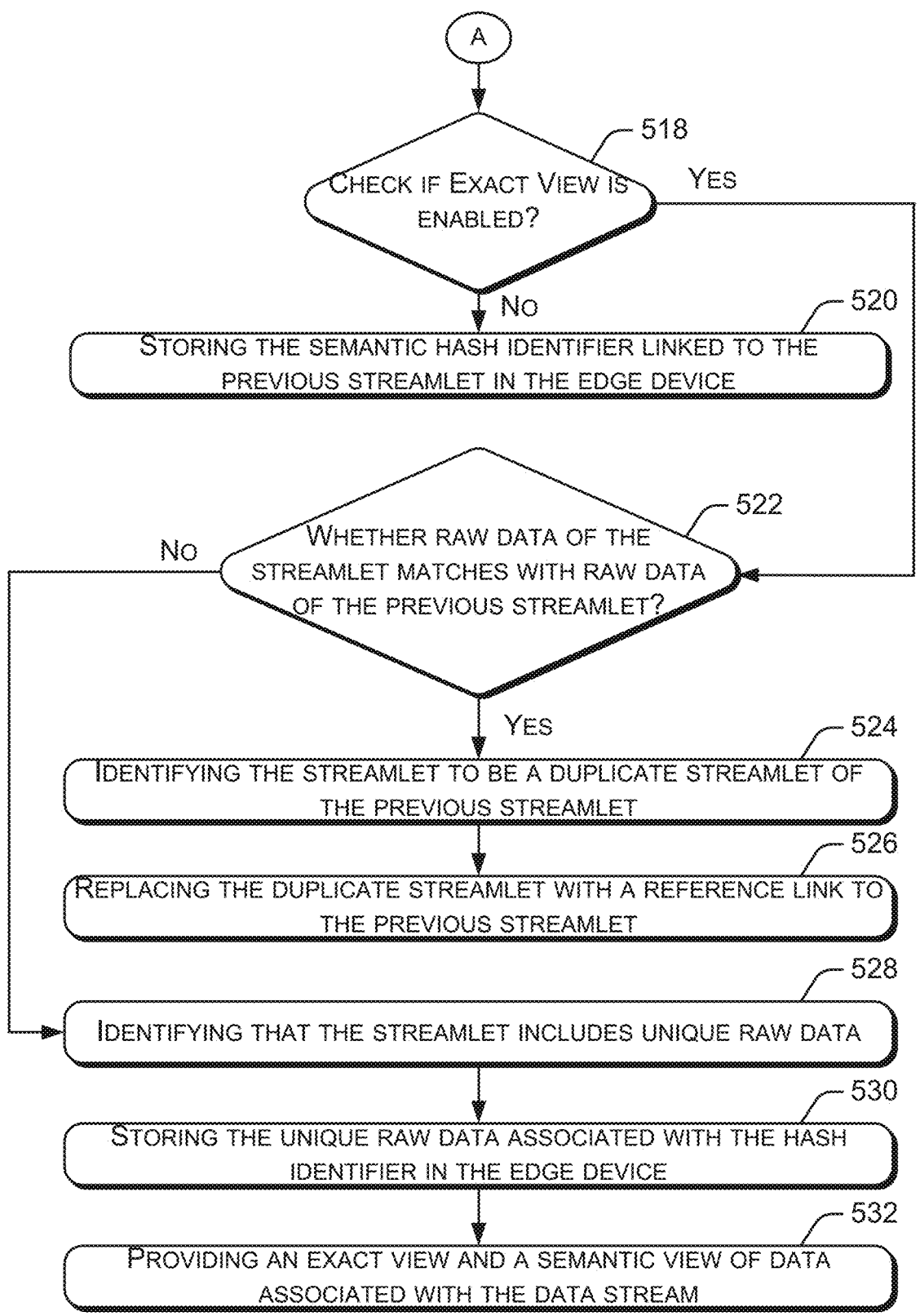

FIG. 5 illustrates a method 500 for data management in a network environment, according to an example. The method 500 can be implemented by processing resource(s) or computing device(s) through any suitable hardware, instructions stored in a non-transitory machine readable medium, or combination thereof. It may be understood that processes involved in the method 500 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media. In an example, steps of the method 500 may be performed by a semantic pattern detection module, such as the semantic pattern detection module 216 and a semantic processing module, such as the sematic processing module 218.

At block 502, a stream store event for storing a data stream in the edge device is intercepted. The data stream includes a plurality of streamlets. In an example, prior to determining the streamlet signature of the streamlet, the data stream received from the source device may be segmented to separate metadata of the data stream from raw data of the data stream, at block 504. The metadata may be stored in a predefined header structure corresponding to the data stream, at block 506. The predefined header structure including information about the raw data and may be communicated to the core device, where it can be used for reconstruction of the data stream. After separating the raw data from the metadata, the raw data of the data stream may be split into a plurality of streamlets, at block 508. At block 510, a semantic pattern in the data stream may be determined. The semantic pattern may be determined according to the method described through the blocks 404 to 414 at FIG. 4.

At block 512, upon determination of the semantic pattern, in response to the streamlet being identified to be semantically unique, a sematic hash identifier is created and associated with the streamlet. The semantic hash identifier may represent a semantic hash value of the streamlet identified to be semantically unique. The semantic hash value may be obtained by applying a semantic hash operation on the streamlet identified as semantically unique. At block 514, the streamlet linked to the semantic hash identifier is stored in the memory of the edge device. The semantic hash identifier points to a memory block in the memory of the edge device where the semantically unique streamlet is stored. The semantic hash identifiers of semantically unique streamlets may be indexed and organized in a hash table which facilitates data lookup and deduplication. In an example, content-addressable stores may be used to store the semantic hash identifier and its associated streamlet(s).

At block 516, in response to the streamlet being identified to be semantically duplicate to a previous streamlet, the streamlet may be replaced by a semantic hash identifier linked to the previous streamlet. The previous streamlet refers to a streamlet of a data stream which was transmitted from the source device to the edge device prior to the current data transfer under consideration. The semantic hash identifier linked to the previous streamlet may represent a hash value of the previous streamlet. The hash value may be obtained on application of a semantic hash operation on the previous streamlet. The semantic hash identifier linked to previous streamlet points to a memory block in the memory of the edge device where the previous streamlet is stored. On replacing the streamlet identified as semantically duplicate to the previous streamlet with the semantic hash identifier linked to the previous streamlet, the semantically duplicate streamlet itself may be discarded.

In an example, when the streamlet is identified as semantically duplicate to the previous streamlet, the streamlet and the previous streamlet may be checked for an exact match. At block 518, it is checked whether exact view is enabled. In an example, if exact view is enabled, the streamlet is compared with the previous streamlet to check for an exact match. If exact view is not enabled, the semantic hash identifier linked to the previous streamlet is stored in the edge device, at block 520.

At block 522, when the exact view is enabled, in response to the streamlet being identified to be semantically duplicate to the previous streamlet, a first hash identifier corresponding to raw data of the streamlet is compared with with a second hash identifier corresponding to raw data of the previous streamlet. The first hash identifier is obtained on applying a hash function on the raw data of the streamlet and the second hash identifier is obtained on applying the hash function on the raw data of the previous streamlet. The first and second hash identifier may be hash values stored in a hash table maintained in the memory of the edge device.

At block 524, in response to the first hash identifier matching with the second hash identifier, the streamlet is identified to be a duplicate streamlet of the previous streamlet. The duplicate streamlet and the previous streamlet has identical raw data values, i.e., the duplicate streamlet and previous streamlet are absolutely identical. On identifying the streamlet to be a duplicate streamlet of the previous streamlet, the duplicate streamlet is replaced with a reference link, such as a hash digest, pointing to the previous streamlet, at block 526. The reference link may be stored in the memory the edge device.

At block 528, in response to the first hash identifier mismatching with the second hash identifier, the streamlet is identified to include unique raw data. Unique raw data refers to unprocessed data points not previously received by the edge device from the source device. Thus, although the streamlet had been identified as a semantic duplicate to the previous streamlet, the raw data values of the streamlet and the previous streamlet are not identical. At block 530, the unique raw data associated with the second hash identifier is stored in the edge device.

At block 532, an exact view and a semantic view of the data stream may be provided. In the exact view, the semantic hash identifier linked to the previous streamlet and the unique raw data associated with the second hash identifier is accessible. In the semantic view, the semantic hash identifier linked to the previous streamlet is accessible.

Figure 6:
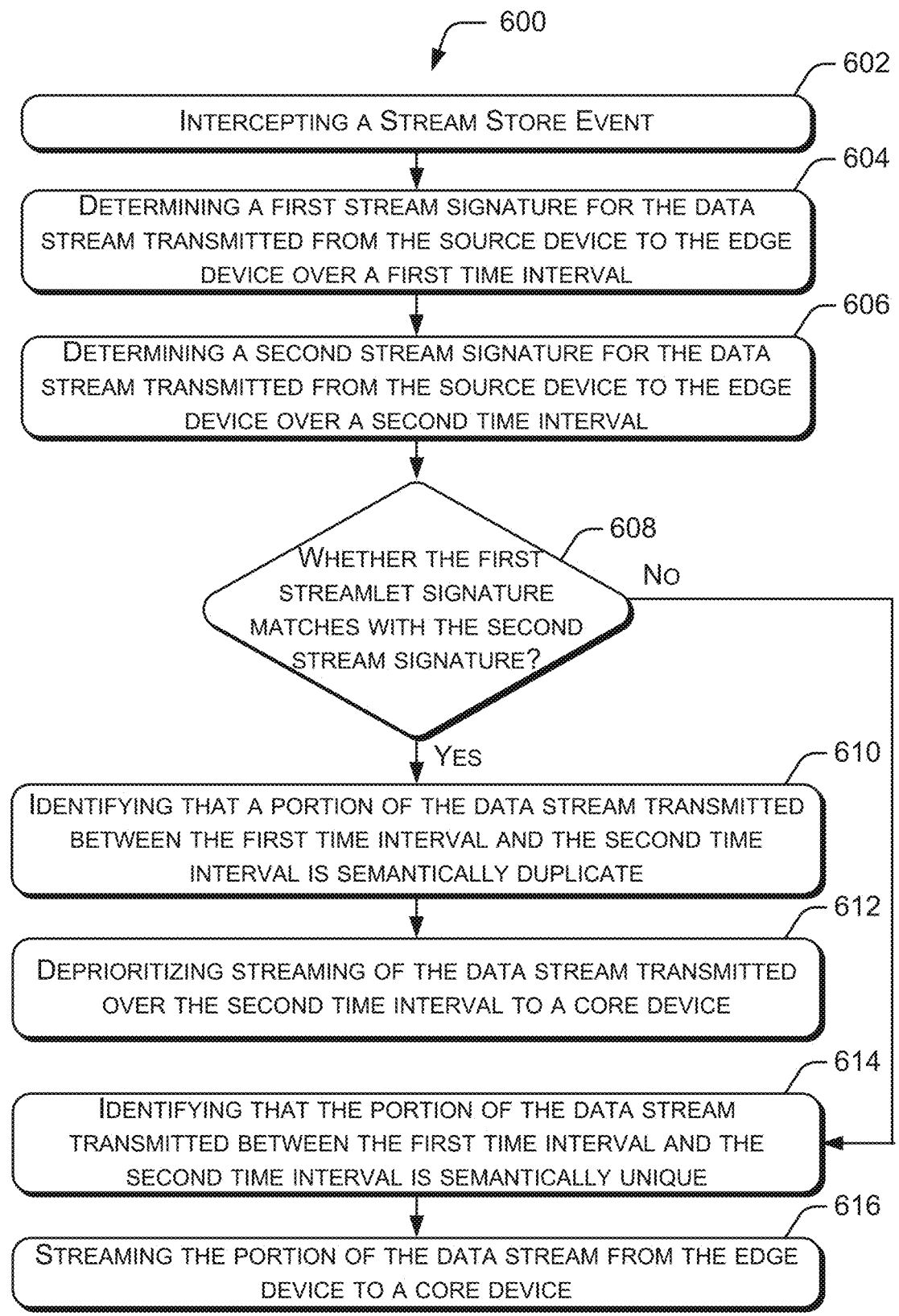
FIG. 6 illustrates a method for data management in the network environment, according to an example.

FIG. 6 illustrates a method 600 for data management in a network environment, according to an example. The method 600 can be implemented by processing resource(s) or computing device(s) through any suitable hardware, instructions stored in a non-transitory machine readable medium, or combination thereof. It may be understood that processes involved in the method 600 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media.

At block 602, a stream store event for storing a data stream in the edge device is intercepted at a current time instance 'tc'. The data stream includes a plurality of streamlets. At block 604, a first stream signature for the data stream transmitted from the source device to the edge device over a first time interval is determined. The first stream signature is indicative of the semantic pattern of the data stream transmitted over the first time interval. The first stream signature may be obtained by applying a data transform operation, such as Discrete Wavelet Transform (DWT) on the data stream transmitted during the first time interval. Consider the first time interval as a time interval between a first time instance 't1' and a second time instance 't2', where the second time instance 't2' lies between the first time instance and the current time instance 'tc'.

At block 606, a second stream signature for the data stream transmitted from the source device to the edge device over a second time interval is determined. The second stream signature is indicative of the semantic pattern of the data stream transmitted over the second time interval. The second stream signature may be obtained by applying a data transform operation, such as Discrete Wavelet Transform (DWT) on the data stream transmitted during the second time interval. The second time interval includes the first time interval. The second time interval is a time interval between the first time instance and the current time instance 'tc'.

The first stream signature is compared with the second stream signature to check whether the first stream signature matches with the second stream signature, at block 608. In response to the first stream signature matching the second stream signature, a portion of the data stream transmitted between the first time interval and the second time interval is identified as semantically duplicate to the data stream transmitted over the first time interval, at block 610. The portion of the data stream refers to a collection of data points in the data stream.

When the portion of the data stream is identified to be semantically duplicate to the data stream transmitted over the first time interval, streaming of the portion of the data stream transmitted between the first time interval and the second time interval to the core device is deprioritized, at block 612. The portion of the data stream identified to semantically duplicate may not provide new or additional insights, hence analytical software applications or models running at the core device may not be retrained based on the portion of the data stream identified to be semantically duplicate. Therefore, such semantically duplicate data may not be transmitted to the core device.

In response to the first stream signature mismatching with the second stream signature, the portion of the data stream transmitted between the first time interval and the second time interval is identified to be semantically unique, at block 614. On identifying the portion of the data stream to be semantically unique, the portion of the data stream may be streamed from the edge device to the core device, at block 616. Since, the portion of the data stream identified to semantically unique provides new or additional insights, hence analytical software applications or models running at the core device may be retrained based on the portion of the data stream identified to be semantically unique. Therefore, such semantically unique data is transmitted to the core device.

Figure 7:
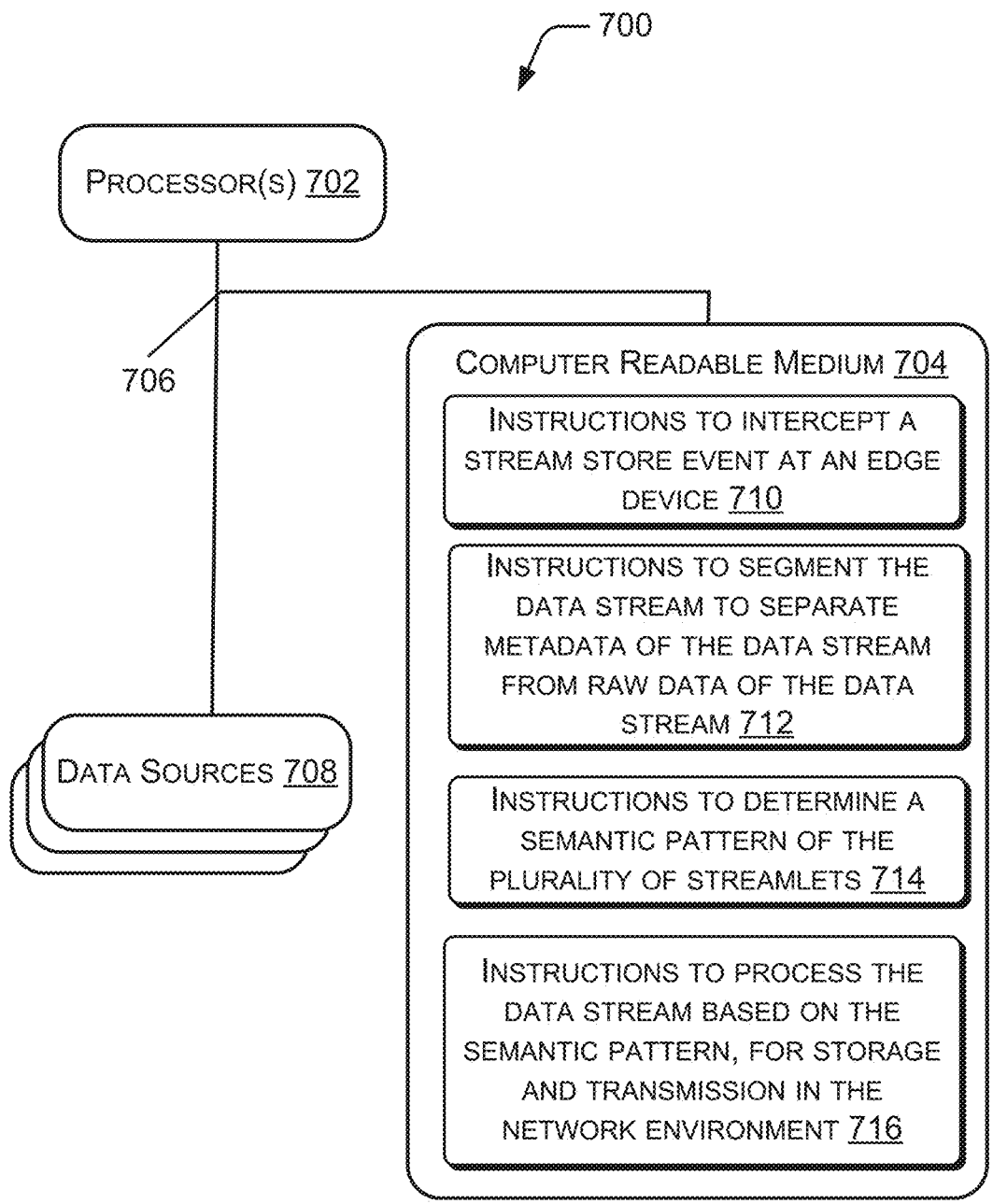
FIG. 7 illustrates a system environment implementing a non-transitory computer readable medium for data management in a network environment, according to an example.

FIG. 7 illustrates a system environment implementing a non-transitory computer readable medium for data management in a network environment, according to an example.

In an example, the system environment 700 includes processor(s) 702 communicatively coupled to a non-transitory computer readable medium 704 through a communication link 706. In an example implementation, the system environment 700 may be a computing system, such as the edge device 100 or 204. In an example, the processor(s) 702 may have one or more processing resources for fetching and executing computer-readable instructions from the non-transitory computer readable medium 704.

The non-transitory computer readable medium 704 can be, for example, an internal memory device or an external memory device. In an example implementation, the communication link 706 may be a direct communication link, such as any memory read/write interface.

The processor(s) 702 and the non-transitory computer readable medium 704 may also be communicatively coupled to data sources 708 over the network. The data sources 708 can include, for example, memory of the system, such as the edge device 100 or 204.

In an example implementation, the non-transitory computer readable medium 704 includes a set of computer readable instructions which can be accessed by the processor(s) 702 through the communication link 706 and subsequently executed to perform acts for data management in a network environment, such as the network environment 200. In an example, the network environment 200 may be an IoT environment.

Referring to FIG. 7, in an example, the non-transitory computer readable medium 704 includes instructions 710 that cause the processor(s) 702 to intercept a stream store event at an edge device, such as the edge device 100 or 204. The stream store event corresponding to processes for storing a data stream transmitted from a source device to an edge device in the network environment.

The non-transitory computer readable medium 704 includes instructions 712 that cause the processor(s) 702 to segment the data stream to separate metadata of the data stream from raw data of the data stream, the raw data of the data stream including a plurality of streamlets.

The non-transitory computer readable medium 704 includes instructions 714 that cause the processor(s) 702 to determine a semantic pattern of the plurality of streamlets, the semantic pattern being indicative of relevance of data samples in the data stream for analysis of the data stream.

In an example, the non-transitory computer readable medium 704 includes instructions that cause the processor(s) 702 to determine a streamlet signature for a streamlet of the plurality of streamlets, the streamlet signature being indicative of the semantic pattern of the streamlet. In an example, the non-transitory computer readable medium 704 includes instructions that cause the processor(s) 702 to identify the streamlet to be semantically duplicate to a previous streamlet of a previous data stream transmitted from a source device, such as the source device 102 or 202 to the edge device, in response to the streamlet signature matching with a previous streamlet signature of the previous streamlet. The semantically duplicate streamlet is irrelevant for analysis of the data stream. In an example, the non-transitory computer readable medium 704 includes instructions that cause the processor(s) 702 to identify the streamlet to be semantically unique, in response to the streamlet signature mismatching with the previous streamlet signature, where the semantically unique streamlet is relevant for analysis of the data stream. Thus, by determining the semantic pattern in the data stream, the streamlets of the data stream may be categorized as semantically unique or semantically duplicate.

The non-transitory computer readable medium 704 includes instructions 716 that cause the processor(s) 702 to process the data stream based on the semantic pattern, for storage and transmission in the network environment.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for data management in a network environment, the method comprising:
   segmenting, by a processing resource of an edge device, a data stream transmitted from a source device to the edge device in the network environment to separate metadata of the data stream from raw data of the data stream;
   storing, by the processing resource, the metadata of the data stream in a predefined header structure;
   splitting, by the processing resource, the raw data of the data stream into a plurality of streamlets;

after the splitting, determining, by the processing resource, a semantic pattern in the data stream, the semantic pattern being indicative of relevance of data samples in the data stream for analysis of the data stream, wherein the data stream includes the plurality of streamlets, and wherein determining the sematic pattern comprises:
  determining, by the processing resource, a streamlet signature for a streamlet of the plurality of streamlets, the streamlet signature being indicative of the semantic pattern of the streamlet,
  comparing, by the processing resource, the streamlet signature to a previous streamlet signature of a previous streamlet of a previous data stream transmitted from the source device to the edge device;
  identifying, by the processing resource, the streamlet to be semantically duplicate to the previous streamlet in response to the streamlet signature matching the previous streamlet signature of the previous streamlet, wherein the semantically duplicate streamlet is irrelevant for analysis of the data stream; and
  identifying, by the processing resource, the streamlet to be semantically unique, in response to the streamlet signature not matching the previous streamlet signature, wherein the semantically unique streamlet is relevant for analysis of the data stream; and
processing, by the processing resource, the data stream based on the semantic pattern, for storage and transmission in the network environment, the processing including:
  in response to the streamlet being identified to be semantically duplicate to the previous streamlet, replacing the streamlet by a semantic hash identifier linked to the previous streamlet; and
  storing the semantic hash identifier linked to the previous streamlet in the edge device.

2. The method as claimed in claim 1, wherein the network environment is an Internet of Things (IoT) environment.

3. The method as claimed in claim 1, wherein the processing comprises:
  in response to the streamlet being identified to be semantically duplicate to the previous streamlet, associating, by the processing resource, the streamlet signature to the previous streamlet; and
  transmitting, by the processing resource, one of the streamlet signature and a linkage information to a core device in the network environment to provide analysis of the data stream, the linkage information being indicative of the association between the streamlet signature and the previous streamlet.

4. The method as claimed in claim 1, wherein the processing comprises transmitting, by the processing resource, the streamlet to a core device in the network environment to provide analysis of the data stream, in response to the streamlet being identified to be semantically unique.

5. The method as claimed in claim 1, wherein the processing comprises:
  in response to the streamlet being identified to be semantically unique,
    creating, by the processing resource, a sematic hash identifier associated with the streamlet; and
    storing, by the processing resource, the streamlet linked to the semantic hash identifier in the edge device.

6. The method as claimed in claim 1, wherein the processing comprises:
  in response to the streamlet being identified to be semantically duplicate to the previous streamlet, comparing, by the processing resource, a first hash identifier corresponding to raw data of the streamlet with a second hash identifier corresponding to raw data of the previous streamlet;
  identifying, by the processing resource, the streamlet to be a duplicate streamlet of the previous streamlet, the duplicate streamlet having identical raw data values as that of the previous streamlet, in response to the first hash identifier matching with the second hash identifier;
  replacing, by the processing resource, the duplicate streamlet with a reference link to the previous streamlet;
  identifying, by the processing resource, that the streamlet includes unique raw data, in response to the first hash identifier mismatching with the second hash identifier;
  storing, by the processing resource, the unique raw data associated with the second hash identifier in the edge device; and
  providing an exact view and a semantic view of data associated with the data stream, wherein in the exact view the semantic hash identifier linked to the previous streamlet and the unique raw data associated with the second hash identifier is accessible and in the semantic view the semantic hash identifier linked to the previous streamlet is accessible.

7. An edge device for data management in a network environment, comprising:
  a processor; and
  a memory coupled to the processor, the memory storing instructions executable by the processor to:
    intercept a stream store event at an edge device, the stream store event corresponding to processes for storing a data stream transmitted from a source device in the network environment to the edge device;
    segment the data stream to separate metadata of the data stream from raw data of the data stream;
    store the metadata of the data stream in a predefined header structure;
    split the raw data of the data stream into a plurality of streamlets;
    after the raw data is split into the plurality of streamlets, determine a semantic pattern in the data stream, the semantic pattern being indicative of relevance of data samples in the data stream for analysis of the data stream, wherein the data stream includes the plurality of streamlets, and wherein determining the sematic pattern comprises:
      determining a streamlet signature for a streamlet of the plurality of streamlets, the streamlet signature being indicative of the semantic pattern of the streamlet,
      comparing the streamlet signature to a previous streamlet signature of a previous streamlet of a previous data stream transmitted from the source device to the edge device,
      identifying the streamlet to be semantically duplicate to the previous streamlet in response to the streamlet signature matching the previous streamlet signature, wherein the semantically duplicate streamlet is irrelevant for analysis of the data stream, and
      identifying the streamlet to be semantically unique, in response to the streamlet signature not matching the previous streamlet signature, wherein the semantically unique streamlet is relevant for analysis of the data stream; and process the data stream based on the semantic pattern, for storage and transmission in the network environment, by responding to the streamlet being identified to be semantically duplicate to the previous streamlet by replacing the streamlet by a semantic hash identifier linked to the previous streamlet and storing the semantic hash identifier linked to the previous streamlet in the edge device.

8. A non-transitory computer-readable medium comprising computer-readable instructions for data management in a network environment, the computer-readable instructions when executed by a processor in the network environment, cause the processor to:

intercept a stream store event at an edge device, the stream store event corresponding to processes for storing a data stream transmitted from a source device to an edge device in the network environment;

segment the data stream to separate metadata of the data stream from raw data of the data stream;

store the metadata of the data stream in a predefined header structure;

split the raw data of the data stream into a plurality of streamlets;

after the raw data is split into the plurality of streamlets, determine a semantic pattern of the plurality of streamlets, the semantic pattern being indicative of relevance of data samples in the data stream for analysis of the data stream, wherein the data stream includes the plurality of streamlets, and wherein determining the sematic pattern comprises:

determining a streamlet signature for a streamlet of the plurality of streamlets, the streamlet signature being indicative of the semantic pattern of the streamlet, comparing the streamlet signature to a previous streamlet signature of a previous streamlet of a previous data stream transmitted from the source device to the edge device, identifying the streamlet to be semantically duplicate to the previous streamlet in response to the streamlet signature matching the previous streamlet signature of the previous streamlet, wherein the semantically duplicate streamlet is irrelevant for analysis of the data stream, and identifying the streamlet to be semantically unique, in response to the streamlet signature not matching the previous streamlet signature, wherein the semantically unique streamlet is relevant for analysis of the data stream; and process the data stream based on the semantic pattern, for storage and transmission in the network environment by responding to the streamlet being identified to be semantically duplicate to the previous streamlet by replacing the streamlet by a semantic hash identifier linked to the previous streamlet and storing the semantic hash identifier linked to the previous streamlet in the edge device.

9. The non-transitory computer-readable medium as claimed in claim 8, wherein the instructions to process the data stream based on the semantic pattern, when executed by the processor, further cause the processor to:

in response to the streamlet being identified to be semantically duplicate to the previous streamlet, associating the streamlet signature to the previous streamlet; and transmitting one of the streamlet signature and a linkage information to a core device in the network environment to provide analysis of the data stream, the linkage information being indicative of the association between the streamlet signature and the previous streamlet.

10. The edge device as claimed in claim 7, wherein to process the data stream based on the semantic pattern the memory stores instructions executable by the processor further to:

in response to the streamlet being identified to be semantically duplicate to the previous streamlet, associate the streamlet signature to the previous streamlet; and transmit one of the streamlet signature and a linkage information to a core device in the network environment to provide analysis of the data stream, the linkage information being indicative of the association between the streamlet signature and the previous streamlet.

11. The method as claimed in claim 1, wherein the streamlet signature is a compressed representation of data samples or trends of data samples present in the streamlet.

12. The method as claimed in claim 11, wherein the compressed representation includes a set of representative coefficients obtained from application of a data transformation on the streamlet.

13. The edge device as claimed in claim 7, wherein the memory stores instructions executable by the processor to transmit the streamlet to a core device in the network environment in response to the streamlet being identified to be semantically unique.

14. The non-transitory computer-readable medium as claimed in claim 8, comprising computer-readable instructions that, when executed by the processor, cause the processor to transmit the streamlet to a core device in the network environment in response to the streamlet being identified to be semantically unique.

15. The edge device as claimed in claim 7, wherein the memory stores instructions executable by the processor to respond to the streamlet being identified to be semantically unique by creating a sematic hash identifier associated with the streamlet and storing the streamlet linked to the semantic hash identifier in the edge device.

16. The non-transitory computer-readable medium as claimed in claim 8, comprising computer-readable instructions that, when executed by the processor, cause the processor to respond to the streamlet being identified to be semantically unique by creating a sematic hash identifier associated with the streamlet and storing the streamlet linked to the semantic hash identifier in the edge device.

* * * * *